Dec. 3, 1968 G. B. FOX 3,414,114
DISHWASHING APPARATUS
Filed July 7, 1967 2 Sheets-Sheet 1
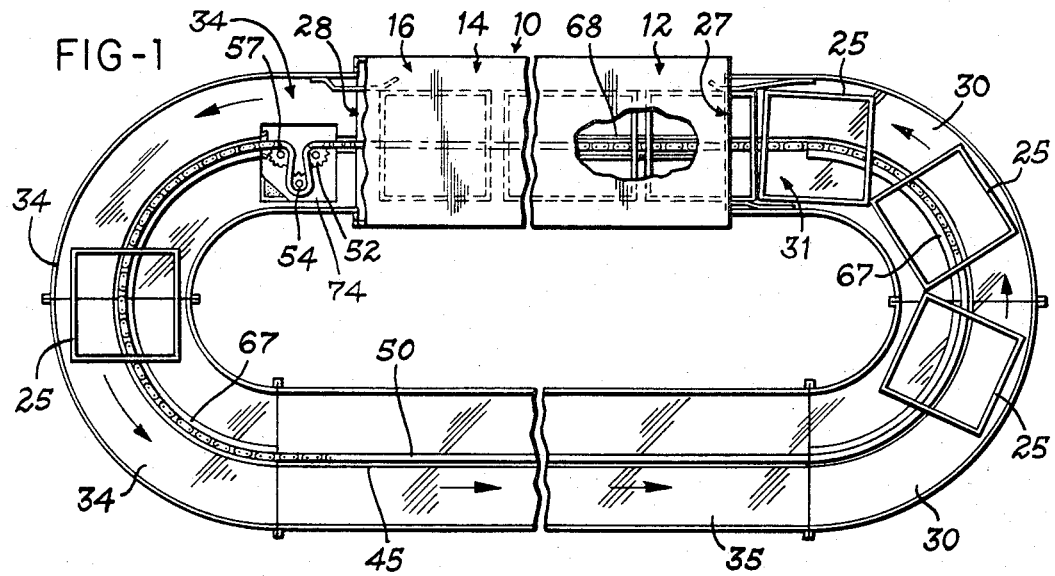
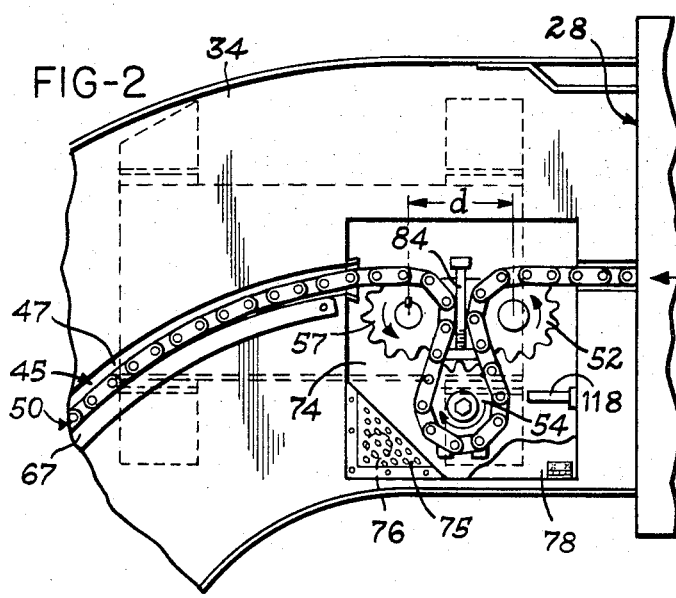
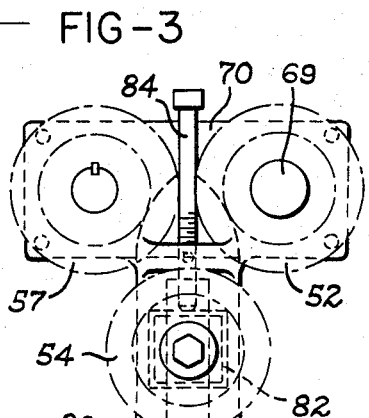
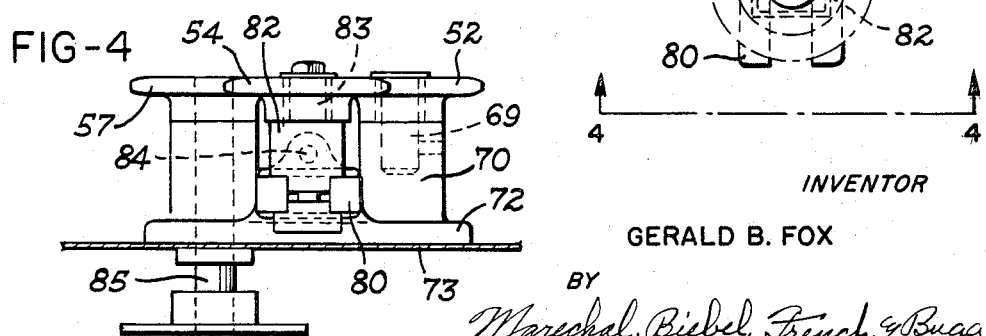
INVENTOR
GERALD B. FOX
BY
Marechal, Biebel, French & Bugg
ATTORNEYS Dec. 3, 1968  G. B. FOX  3,414,114
DISHWASHING APPARATUS
Filed July 7, 1967  2 Sheets-Sheet 2
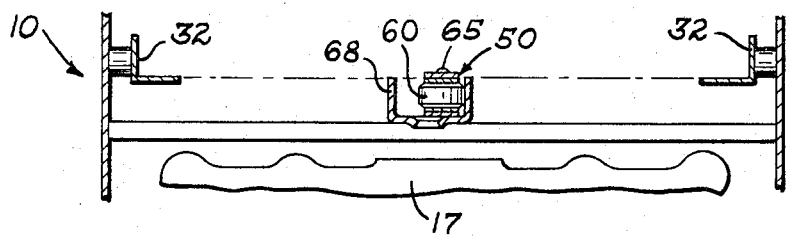
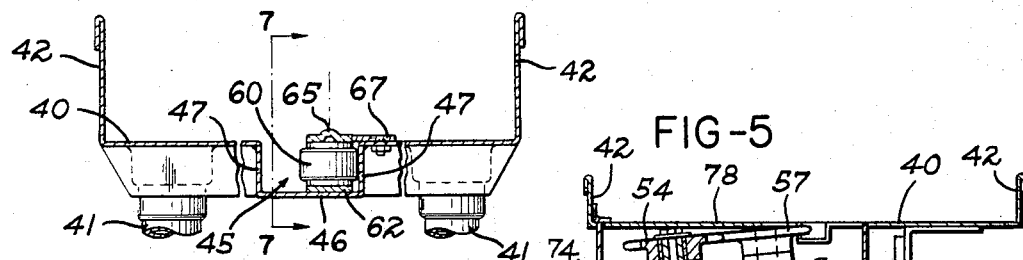
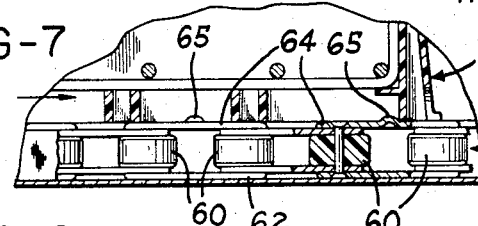
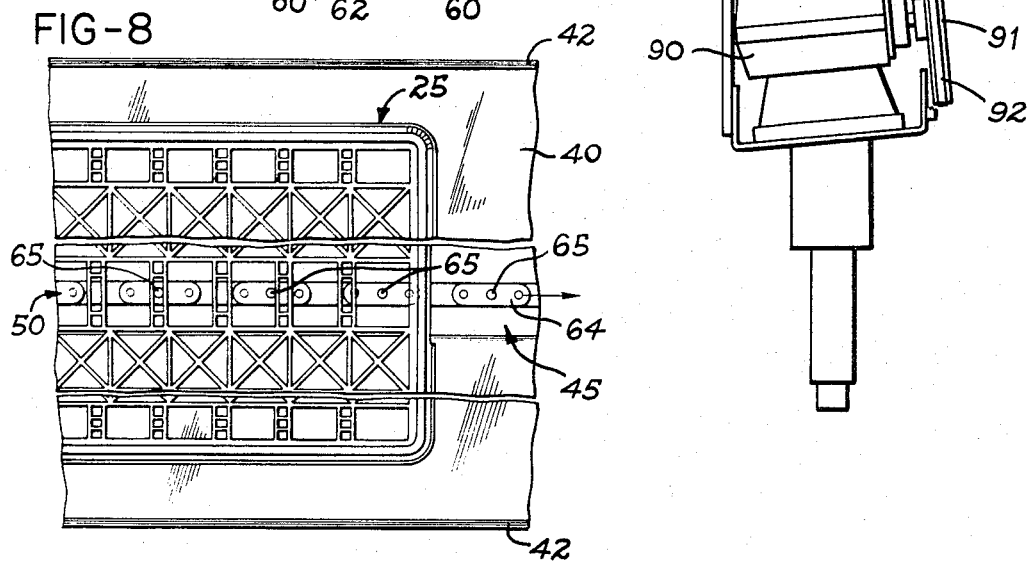

3,414,114
DISHWASHING APPARATUS
Gerald B. Fox, Troy, Ohio, assignor to The Hobart Manufacturing Company, Troy, Ohio, a corporation of Ohio
Filed July 7, 1967, Ser. No. 651,924
3 Claims. (Cl. 198—181)

ABSTRACT OF THE DISCLOSURE

The diswashing conveyor includes chain means moveable in a channel located in a supporting surface for dish racks. A portion of the chain protrudes above the level of the supporting surface to convey the racks. The drive means for the chain conveyor is located at one edge of the washer, see 54 in FIGURE 2, so as to draw the chain against the channel and permit the chain to return to an immediately adjoining channel.

---

This invention relates to dishwashing apparatus, and particularly to an improved and simplified form of dishwashing system, including a dishwashing machine and an associated continuous conveyor to carry racks of soiled dishes to be cleansed through the dishwashing machine.

The present invention is related to the invention disclosed and claimed in copending application Ser. No. 541,190, filed Apr. 8, 1966, and assigned to the assignee of this application. Specifically, the present invention relates to a similar form of dishwashing apparatus in which a single continuous conveying system is used to feed the dishwashing machine, handling dish-carrying racks around an endless path in which the dishwashing machine is incorporated.

The object of the invention is to provide a dishwashing system including a simplified and easily maintained conveyor which can move dish-carrying racks over the entrance and exit tables of the dishwashing machine, and through the dishwashing machine itself, employing a continuous conveyor chain, and to provide such a dishwashing system in which a portion of the conveying chain is guided along a level lower than the remainder of the chain where the conveyor can conveniently be driven without interference with the racks, and to provide such a dishwashing system in which the racks can readily disengage from the conveying chain in the case of an obstruction being encountered, without producing a large overload on the conveyor drive.

Other objects and advantages of the invention will be apparent from the following description, the accompanying drawings and the appended claims.

In the drawings—

FIG. 1 is a plan view of a typical form of dishwashing system in accordance with the invention, showing the closed circuit conveyor arrangement as an oval with flat sides, one of which embodies the dishwashing machine;

FIG. 2 is an enlarged detail plan view of the chain guiding and drive mechanism for the system shown in FIG. 1;

FIG. 3 is a detail view of the mounting for the chain driving sprockets shown in FIG. 2, including an adjustment for tension in the chain;

FIG. 4 is an end view taken on line 4—4 of FIG. 3.

FIG. 5 is a vertical sectional view through the chain drive, with the speed reducer shown in elevation;

FIG. 6 is a broken cross-sectional view showing the conveyor chain supported in an open trough;

FIG. 7 is a sectional view taken generally on line 7—7 in FIG. 6, with parts of the chain broken away to show details thereof;

FIG. 8 is an enlarged plan view of a portion of the conveying system, with a segment of a dish-carrying rack shown engaging the conveyor chain; and FIG. 9 is a sectional view through the rack supporting structure and conveyor in the dishwashing machine.

Referring to the drawings which illustrate a preferred embodiment of the invention, the system as shown in FIG. 1 incorporates a dishwashing machine of the type intended for continuous operation, such as shown in U.S. Patent No. 2,073,521 or in U.S. Patent No. 2,974,672. The latter patent illustrates a typical dishwashing machine with a continuously operating chain-type conveyor, where the conveying chains are so mounted as to move along upper and lower flights, hence with the rollers of the chains vertical. In the present invention, the chain rollers are arranged horizontally, and preferably a single chain is used rather than the dual chain arrangement shown in that patent.

The dishwashing machine, as shown in FIG. 1, has a housing 10 defining a prewash chamber 12, a main wash chamber 14, and a rinse chamber 16. These chambers include conventional tanks beneath them, and there are motor-driven recirculating pumps (not shown) that withdraw washing liquid from the tanks and supply the liquid to the spray heads 17 (FIG. 9) of the respective sections or chambers of the machine.

These spray heads, of conventional construction such as shown in said patents, direct a flow of cleansing liquid over the soiled dishes which are carried within the racks 25, tending to flush any waste particles and the like from the dishes and through strainers back to the tanks. Typical rack construction are shown in U.S. Patent No. 2,804,213, No. 3,009,579, and No. 3,141,552.

The entrance to the housing 10 and the prewash structure is provided by an opening at the prewash chamber 12, said opening being indicated generally at 27. The exit from the final rinse section 16 is provided through a discharge or exit opening 28, and both these openings, as well as the areas between the sections of the machines, can be closed by conventional flexible curtains. These items are omitted from the drawings in order to simplify the illustrations.

As shown in FIG. 1, the racks 25 are supported as they approach the entrance opening on conveyor table section 30 which includes a straight entrance portion 31 of sufficient length to assure that the racks are squared with respect to the supporting chambers or surfaces within the dishwashing machine. These supporting surfaces may be merely L-shaped members 32 (FIG. 9) extending the length of the dishwashing machine, immediately above the spray heads and spaced apart by a distance slightly greater than the width of the racks. The edges of the racks thus can slide on the horizontal portion of these L-shaped members, and in turn these portions are mounted to coincide with the surfaces of the table sections 30 and 31.

At the exit end of the machine, there is an exit table section 34 which receives the racks of cleansed dishes discharged from the machine. The joining table section 35 is attached to the sections 30 and 34, thereby providing a completely closed path or loop along which the racks can move. The section 35 may also provide a convenient location for loading and/or unloading racks from the system.

As shown in FIG. 6, which is a typical cross-section of the table construction, the bottom 40 is essentially flat, supported by suitable legs 41, and having side walls 42 which extend upwardly from the bottom, spaced somewhat farther apart than the width of the racks 25. The spacing should be sufficient to permit the racks to move around the curves in the end table sections, as shown in FIG. 1. The table sections have an open top channel formed at the bottom 40, and indicated by the reference numeral 45. Preferably this channel is formed integrally with the bottom of the table and includes a depressed bottom wall 46 and side walls 47. The channel configuration is formed through the end table sections 30 and 34, and also the entrance section 31, and partially into the joining table section 35, as shown in FIG. 1. The channel portions are aligned such that a continuous trough or conduit configuration is provided, and a U-shaped, upwardly opening channel member 68 extends through the dishwashing machine 10, joining the table sections at either end of the machine and bridging the tanks and wash heads within the machine.

A flexible conveyor chain 50 passes through this channel or trough structure and around a guiding sprocket 52, a tension adjustment sprocket 54, thence from the sprocket 54 around a drive sprocket 57 and also guides the chain back into the channel. The chain preferably includes rollers 60 (FIGS. 6 and 7) which are formed of stainless steel or covered with a synthetic resin material. The links are of conventional overlapping construction, shown in FIG. 7, with the links of greater height having bottom link parts 62 resting on the bottom surface 46 of the channel, and the corresponding top link parts 64 slightly above the level of the table surface 40, particularly as shown in FIG. 6.

The link parts 64 incorporate suitable pusher members, shown in the form of dimples 65 formed upwardly from the parts 64. Preferably each of the link parts 64 has such a member in order to provide a plurality of regularly spaced pusher members along the entire length of the upper surface of the chains. As mentioned, the rollers 60 extend horizontally (i.e., they rotate on a vertical axis) and the rollers engage the inner wall of the channel, as shown in FIG. 6. When power is applied to the drive sprocket, sufficient tension is produced in the chain to hold it against this inner wall of the channel, and where the chain passes around the curves, guiding rails 67 can be provided to overcome any tendency of the chain to work out of the channel. The rails will engage the upper edge of the rollers 60 if this occurs.

The racks 25 are conventional types, and may be formed of wire, sometimes plastic coated, or suitable molded plastic. A typical molded plastic rack structure is shown in FIG. 8, and it will be noted that any of the pusher members 65 may engage with various cross-members of the rack. Since the racks are resting on the table surface 40, and the link parts 64 project slightly above this surface, the conveyor chain tends to support part of the weight of the loaded rack, and the rack will slide readily along at least one side of the table surface outwardly of the channel and the chain. The conveyor chain thus will push the racks along the table sections in sliding fashion, and similarly along the supporting L-shaped members 32 through the dishwashing machine, hence these supporting surfaces are considered as part of the conveying system.

If there is an obstruction presented to any rack, the chain will tend to slide under it, and the structure of the pusher members 65, with sloping walls, tends to assist this action, with the conveyor chains readily sliding under the rack in this instance, until the obstruction is removed. The conveyor chain thus can overrun the racks, but with little jostling of the racks when this occurs.

The conveyor chain is guided by the idler sprocket 52 down below the table surface (see FIG. 5), around sprocket 54, then outward and upward and around the drive sprocket 57. The chain is thus guided below a level where it can engage a rack, but only for a distance (d on FIG. 2) which is less than the normal minimum length of a rack.

The idler sprocket 52 is mounted on a stub shaft 69 which in turn is supported in a mounting block or base 70. The block 70 has a base flange 72 bolted to the bottom 73 of a tank 74 that provides a housing for the sprockets within the table section 34. Since some water will be present on the table surface, and will drain along the channel, the tank is provided with a strainer 75 and a drainpipe 76, and with a hinged protective cover 78. The block 70 includes a guideway 80 which carries a sliding block 82 supporting a stub shaft 83 holding sprocket 54 at the same slight inclination as sprocket 52. An adjusting screw 84 moves block 82 along the guideway. The drive shaft 85 extends through block 70 and is connected to the drive sprocket 57 and at its lower end the output of a friction clutch 87, through a drive pin connection 88.

This clutch is on the output of a speed reducer unit 90, and its input is provided by a pulley 91 driven by a belt 92 from a smaller variable pulley not shown which is on the output of a suitable electric motor, also not shown. The motor is fastened to an adjustable mounting bracket as shown in said application Ser. No. 541,190, which can rock to adjust the size of the variable pulley, thereby controlling the speed of the conveyor.

The sprocket 54 may be adjusted sufficiently to keep proper tension in the chain, merely by turning the screw 84 in the proper direction. When the drive motor is operating, there is sufficient tension in the chain to pull it into engagement with the inner wall of the channel, but when the drive power is cut off, the chain becomes sufficiently slack so that it can easily be lifted out of the channel for purposes of flushing the channel of any waste particles and also cleaning the chain. If desired, a jet of water can be provided from the tube 118 (FIG. 2) to flush the chain during operation, in addition to the cleaning which will result from the chain moving from the dishwashing machine with the racks.

Various other arrangements and configurations of the conveyor can be provided, such as those disclosed in said application Ser. No. 541,190. Likewise, various different forms of the pusher member 65 can be provided, such as disclosed in that application. The present invention thus provides a simply constructed and easily maintained dishwashing system in which the conveyor is continuous and can be connected directly through the dishwashing machine, with simple adaptations to the dishwashing machine structure such as shown in FIG. 9.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a dishwashing system including a dishwashing machine having a chamber providing an enclosure containing washing and rinsing apparatus, said chamber having an inlet opening at one end thereof and an exit opening at the end opposite from said inlet opening, rack supporting means extending through said chamber, entrance and exit tables extending from said machine at said entrance and exit openings respectively, a joining table section connected between said entrance and exit sections providing a completed closed circuit path for dish carrying racks from said exit opening to said entrance opening, said table sections and said chamber including surfaces for supporting the racks during movement around said path; means forming an open top channel extending through said chamber and along said entrance and exit table sections and along said joining table section, a drive and guiding mechanism mounted in one of said table sections and including chain guiding mechanism aligned with said channel and arranged to guide a conveyor chain to one side and below said channel and thence back to the channel, a conveyor provided as a flexible chain having lower link portions resting in sliding engagement on the bottom of said channel and pusher members formed as extensions from the upper part of said chain projecting slightly above the open top of said channel and the rack supporting surface of said table sections and said rack supporting means in said chamber, and drive means supported under said drive and guiding mechanism including a sprocket receiving the chain from said guiding mechanism and adapted to pull said chain through said channel in a direction to move the chain through said chamber from its inlet to its exit and to provide sufficient tension in the chain to maintain it within said channel during operation.

2. A dishwashing system as defined in claim 1, wherein said drive means includes a drive sprocket mounted inclined to and to one side of said channel, and said guiding mechanism guiding said chain out of and into said channel portion at locations spaced closer together than the normal length of the individual racks.

3. A dishwashing system as defined in claim 2, wherein said guiding mechanism includes a pair of idler sprockets one of which is mounted tangentially to said channel and inclined downwardly away therefrom to guide the chain laterally and below said channel, and adjustable means supporting the other said idler sprocket at the same inclination and somewhat below said one idler sprocket, said adjustable means providing for movement of said other idler sprocket toward and away from said channel to change the length of the path the chain must follow and thus to adjust the tension of said chain.

References Cited

UNITED STATES PATENTS 3,384,097   5/1968   Meeker _____ 198—189 X

EDWARD A. SROKA, *Primary Examiner.*